United States Patent
Mirzoev et al.

(10) Patent No.: US 12,469,589 B2
(45) Date of Patent: Nov. 11, 2025

(54) SYSTEMS, METHODS, AND DEVICES FOR HUB, SPOKE AND EDGE RENDERING IN A PICTURE ARCHIVING AND COMMUNICATION SYSTEM (PACS)

(71) Applicant: Hyland Software, Inc., Westlake, OH (US)

(72) Inventors: Firdaous Mirzoev, Westlake, OH (US); Dan Matei, Westlake, OH (US); Razvan Atanasiu, Westlake, OH (US)

(73) Assignee: Hyland Software, Inc., Westlake, OH (US)

( * ) Notice: Subject to any disclaimer, the term of this patent is extended or adjusted under 35 U.S.C. 154(b) by 0 days.

(21) Appl. No.: 17/988,967

(22) Filed: Nov. 17, 2022

(65) Prior Publication Data

US 2024/0171645 A1 May 23, 2024

(51) Int. Cl.
*G16H 30/20* (2018.01)
*H04L 67/2876* (2022.01)
*H04L 67/289* (2022.01)

(52) U.S. Cl.
CPC ......... *G16H 30/20* (2018.01); *H04L 67/2876* (2013.01); *H04L 67/289* (2013.01)

(58) Field of Classification Search
CPC ........ G16H 30/00; G16H 30/20; G16H 30/40; H04L 67/2866; H04L 67/2871; H04L 67/2876; H04L 67/288; H04L 67/2885; H04L 67/289; H04L 67/01; H04L 67/02; H04L 67/10
See application file for complete search history.

(56) References Cited

U.S. PATENT DOCUMENTS

| | | | | |
|---|---|---|---|---|
| 8,712,120 B1* | 4/2014 | Reicher | ................... | G16H 30/20 382/128 |
| 2002/0184238 A1* | 12/2002 | Chylla | ................ | H04N 1/00827 |
| 2005/0080330 A1* | 4/2005 | Masuzawa | ............. | G16H 30/20 600/407 |
| 2007/0107033 A1* | 5/2007 | Ho | .......................... | G16H 30/20 725/115 |
| 2007/0115282 A1* | 5/2007 | Turner | ................... | G16H 30/40 345/424 |

(Continued)

OTHER PUBLICATIONS

Engel, Klaus, et al. "Combining local and remote visualization techniques for interactive volume rendering in medical applications." Proceedings Visualization 2000. VIS 2000 (Cat. No. 00CH37145). IEEE, 2000. (Year: 2000).*

(Continued)

*Primary Examiner* — Vivek Srivastava
*Assistant Examiner* — William C McBeth
(74) *Attorney, Agent, or Firm* — Eschweiler & Potashnik, LLC

(57) ABSTRACT

Techniques, described herein, enable enhanced rendering solutions for digital imaging and communications in medicine (DICOM) objects to different rendering architectures. DICOM objects are rendered over one or more of: a hub server-side rendering architecture or a hub and spoke server-side rendering architecture based on one or more network parameters. Additionally, or alternatively, the DICOM objects are rendered over an edge-side rendering architecture based on the one or more network parameters.

8 Claims, 8 Drawing Sheets

(56) References Cited

U.S. PATENT DOCUMENTS

| | | | | |
|---|---|---|---|---|
| 2007/0237402 A1* | 10/2007 | Dekel | .................... | G16H 30/20 382/128 |
| 2009/0138544 A1* | 5/2009 | Wegenkittl | ............ | G06F 9/5083 709/226 |
| 2010/0036879 A1* | 2/2010 | Friese | .................... | G16H 30/20 707/E17.02 |
| 2010/0080476 A1* | 4/2010 | Khorasani | .............. | G16H 30/20 382/235 |
| 2012/0084350 A1* | 4/2012 | Xie | ....................... | G06F 9/5088 709/203 |
| 2013/0014064 A1* | 1/2013 | Zhu | ..................... | H04L 67/2885 715/850 |
| 2014/0074913 A1* | 3/2014 | Claydon | ................ | G16H 30/20 709/203 |
| 2014/0379838 A1* | 12/2014 | Gasser | ................ | H04L 67/1095 709/213 |
| 2016/0147952 A1* | 5/2016 | Garcia | .................... | G16H 10/60 705/2 |
| 2018/0032677 A1* | 2/2018 | Adriaensens | .......... | G16H 30/20 |
| 2018/0068065 A1 | 3/2018 | Bronkalla | | |
| 2019/0304590 A1* | 10/2019 | Wilson | .................... | G16H 30/20 |
| 2020/0058388 A1* | 2/2020 | Vincent | .................. | G16H 30/40 |
| 2020/0195541 A1 | 6/2020 | Tamasi et al. | | |
| 2020/0404045 A1 | 12/2020 | Bitincka et al. | | |
| 2022/0253219 A1* | 8/2022 | Grunwald | ............... | G06F 3/065 |
| 2022/0392615 A1* | 12/2022 | Gao | ....................... | G16H 30/20 |
| 2024/0168696 A1* | 5/2024 | Vincent | .................... | G06T 1/60 |

OTHER PUBLICATIONS

Hyland Healthcare. Nilread enterprise and diagnostic viewer. [retrieved on Jan. 26, 2023]. Retrieved from the internet. <URL: https://www.hyland.com/-/media/Project/Hyland/Common/pdfs/product-overview/hc_product_overview_nilread-enterprise-and-diagnostic-viewer.pdf?sc_lang=en-ZA> entire document.

Hyland Healthcare. Nilread hub and spoke deployment model. [retrieved on Jan. 26, 2023]. Retrieved from the internet (URL: https://www.hyland.com/-/media/Project/Hyland/Common/pdfs/solution-summary/hc_solution_overview_nilread_hub-and-spoke_v2.pdf?sc_lang=en-GB> entire document.

Search Report and Written Opinion dated Jan. 31, 2023 in connection with PCT Application No. PCT/US2022/050207.

* cited by examiner

SYSTEMS, METHODS, AND DEVICES FOR HUB, SPOKE AND EDGE RENDERING IN A PICTURE ARCHIVING AND COMMUNICATION SYSTEM (PACS)

FIELD

This disclosure relates to computerized networks and data management systems for imaging and communications in the healthcare field.

BACKGROUND

Computerized networks and data management systems can include a variety of systems, devices, and technologies to enable users to create, store, access, and distribute information. Such networks can include one or more wired networks, wireless networks, or a combination thereof. Each network can include a broad range of interconnected devices, each comprising hardware, software, virtualization technology, etc., which enables the devices to send, receive, process, or store information. Examples of such devices can include user equipment (UE), including mobile UE devices (e.g., cell phones, tablet computers, laptop computers, etc.), stationary devices (e.g., desktop computer, servers, workstations, etc.), and network components and devices (e.g., network hubs, routers, base stations, satellite systems, etc.).

Digital imaging and communications in medicine (DICOM) is a standard used for the communication and management of medical imaging information and related data. DICOM can be used by, for example, hospitals, doctor offices, government agencies, research institutions, and other types of organizations. DICOM can be implemented for storing and transmitting medical images, enabling the integration of medical imaging devices such as scanners, servers, workstations, printers, network hardware, and picture archiving and communication systems (PACS) from one or more various manufacturers.

BRIEF DESCRIPTION OF THE DRAWINGS

The present disclosure will be readily understood and enabled by the detailed description and accompanying figures of the drawings. Like reference numerals may designate like features and structural elements. Figures and corresponding descriptions are provided as non-limiting examples of aspects, implementations, etc., of the present disclosure, and references to "an" or "one" aspect, implementation, etc., may not necessarily refer to the same aspect, implementation, etc., and may mean at least one, one or more, etc.

DETAILED DESCRIPTION

Figure 1:
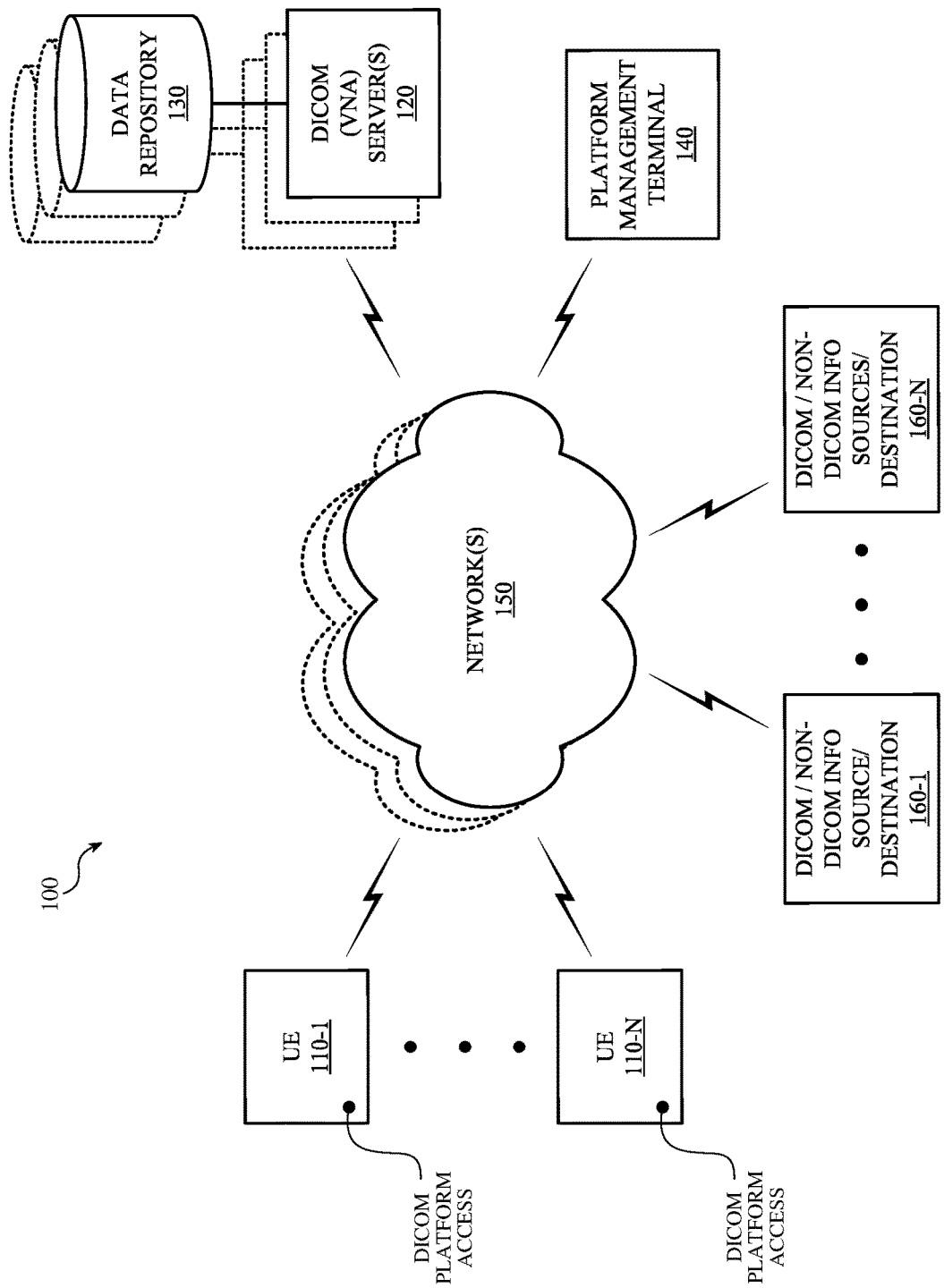
FIG. 1 is a diagram of an example network according to one or more implementations described herein.

The following detailed description refers to the accompanying drawings. Like reference numbers in different drawings can identify the same or similar features, elements, operations, etc. Additionally, the present disclosure is not limited to the following description as other implementations can be utilized, and structural or logical changes made, without departing from the scope of the present disclosure.

Digital imaging and communications in medicine (DICOM) is a standard used for the communication and management of medical imaging information and related data. DICOM can be used by hospitals, doctor offices, government agencies, research institutions, as well as other organizations. DICOM can be implemented for storing, transmitting medical images, and enabling the integration of medical imaging devices such as scanners, servers, computer workstations, printers, network hardware, and picture archiving and communication system(s) (PACS) from multiple manufacturers, for example. DICOM standards describe a format of medical images, as well as their distribution, in terms of a communication protocol as defined by DICOM to facilitate the interoperability of one or more medical imaging equipment across a domain of health enterprises or image rendering architectures from a dedicated server or a hub server. DICOM content can include a range of biological imaging results and can include images generated through radiology and other radiological sciences, including nuclear medicine, thermography, microscopy, microscopy and medical photography, among others. DICOM content can be referred to in this disclosure as images following or configured according to the DICOM standard, while non-DICOM content can refer to other forms and types of medical or healthcare content not following the DICOM standard as known in the art. An example of other standards that also may be used and referred to as non-DICOM content to communicate healthcare-related or medical data could be .pdf reports, medical images or related data stored in a native format common in medical fields of ophthalmology, dermatology, microscopy, endoscopy video, etc, as well as other document formats (.doc or the any other format), which can be referred to as non-DICOM content. While DICOM is typically used to encapsulate imaging-related content, non-DICOM content can also be exchanged between one or more information systems (e.g., a PACS, or other server system) for a medical environment. Both non-DICOM content and/or DICOM content can be referred to herein as clinical data.

Medical imaging technology (e.g., PACS) used across healthcare organizations to securely store and digitally transmit electronic images along with associated clinical data and reports can enable medical documentation and images to be securely stored in off-site servers and safely accessed from any location using PACS software, computerized workstations, mobile devices, or other UE devices. Today, radiologist and clinicians are not usually located on the same premises as the clinical data that they are evaluating when utilizing PACS to determine a patient diagnosis. On low quality wide area network (WAN) (e.g., public internet)

connections, user equipment (UE) devices (e.g., a workstation or the like) can experience performance issues such as a long delay to access clinical data or experience poor image manipulation interactivity (e.g., annotation, segmentation, augmentation, suggestion selection, slicing, scribble, bounding, extreme clicking, correction, tagging or labeling, 3D imaging operations, and the like). As such, a tradeoff can occur between latency and smoothness of interactive visualization depending on the configuration of rendering architecture. As such, aspects herein describe a hybridized rendering model that configured different rendering architectures within a PACS for medical imaging from DICOM content and/or non-DICOM content or objects according to user's demands and network parameters. The system and its various hybridized architectures can be implemented during deployment or dynamically depending on changing conditions or changing parameters, including latency, geographical proximity to the hub or data center, usage patterns, a desired tradeoff between latency and smoothness of interaction, and the other parameters.

Moreover, radiologist or clinicians selecting a PACS can be forced to choose between either a client-side rendering architecture or a server-side rendering architecture as a group, without an ability to individually choose which approach of rendering, or which architectural configuration of rendering is more appropriate based on current network parameters (e.g., the particular UE location, data location relative to the central data center or server, usage pattern of interactivity, etc.). In an example aspect, a PACS can configure at the same time hub server-side rendering via a hub server-side architecture, a hub and spoke server-side rendering via a hub and spoke (or Spoke) server-side architecture, and edge-rendering via an edge-side rendering architecture. Each rendering architecture of the system can be configured one to one or one to many with respect to a central data center or central server according to each user or individual UE device and various network parameters or the demands for image diagnostics, especially DICOM content. The hub server-side rendering architecture, the hub and spoke server-side rendering architecture, or the edge-side rendering architecture can be configured based on a latency, a geographical proximity to a data center (hub or spoke) location, a usage pattern of a client device, a trade-off of latency and network speed time, or other parameter.

When one or more of the network parameters satisfy a predetermined threshold, the UE can be configured according to a particular rendering architecture as a spoke, proxy or edge client in the rendering system. This can be performed at the time of deployment, at other times, or more dynamically. For example, when a network latency or other parameters satisfy a predetermined threshold (e.g., when UE or local area network latency is at or above a latency threshold), an edge-side rendering architecture can be configured. If the latency is below the predetermined threshold, a server-side rendering architecture (e.g., a hub, or hub and spoke server-side rendering architecture) can be configured. As such, a hybridized rendering model can be configured in a PACS so that different interactions with the DICOM content and/or non-DICOM content can be tailored for each individual or group with various aspects further described herein.

FIG. 1 is a diagram of an example environment 100 in which devices, systems or methods, described herein, can be implemented. As depicted, environment 100 can include user equipment (UE) 110-1, . . . 110-N (where N is greater than or equal to 2 and collectively, or individually, can be referred to in this disclosure as UEs 110, UE 110, or UE device(s) 110), DICOM servers 120, data repositories 130, platform management terminal 140, DICOM/Non-DICOM source/destination 160-1, . . . 160-M (where N is greater than or equal to 2 and collectively referred to as "DICOM/Non-DICOM sources/destinations 160"), and network 150. The number of devices or network, illustrated in FIG. 1, is provided for explanatory purposes only. In practice, there can be additional devices or networks, fewer devices or networks, different devices or networks, or differently arranged devices or networks than illustrated in FIG. 1. Devices of environment 100 can interconnect via wired connections, wireless connections, or a combination of wired and wireless connections. Also, in some implementations, one or more of the devices of environment 100 can perform one or more functions described as being performed by another one or more of the devices of environment 100.

UE or UE device 110 can include any type of computing device, system or computing architecture, such as a wired or wireless user device, that is capable of communicating with a network 150. For example, UE 110 can include a smartphone, tablet computer, laptop computer, wearable device, etc. UE 110 can alternatively include a desktop computer, a radiotelephone, a personal communications system (PCS) terminal (e.g., that can combine a cellular radiotelephone with data processing and data communications capabilities), a personal digital assistant (PDA) (e.g., that can include a radiotelephone, a pager, Internet/intranet access, etc.), or another type of computation or communication device. UE 110 can include any variety of peripheral devices, such as speaker, cameras, external storage devices, etc. UE 110 can include a browser or another type of application or interface capable of accessing a DICOM platform or network architecture hosted by DICOM servers 120.

DICOM servers 120 can include one or more servers or other types of computing devices, systems or architectures capable of gathering, processing, searching for, storing, or communication information as described herein (e.g., as data center 360, 460, 560 or other central hub. In some implementation, DICOM servers 120 can include an application server or a web server that stores one or more applications or that permits the one or more applications to be accessed or downloaded by UEs 110. DICOM servers 120 can include a single server device, group of server devices, or one or more virtual servers with virtual machines, and components. In some implementations, DICOM servers 120 can comprise a DICOM platform as described herein. The DICOM platform can operate, in accordance with DICOM standards, to receive, store, process, secure, or provide DICOM information as a computing environment with hardware, software, firmware or a combination thereof, with an operating system, a browser, and application programming interfaces for executing software. The DICOM platform can also, or alternatively, include one or more components, features, or processes capable of performing some or all of the aspects or techniques described herein. In some implementations, DICOM servers 120, in combination with one or more other types of devices, e.g., UEs 110, data repositories 130, platform management terminals 140, etc., can comprise a DICOM platform. In some implementations, DICOM servers 120 can include a vendor neutral achieve (VNA) system capable of receiving and storing DICOM information and other types of data from a variety of sources, such as research instructions, hospitals, doctor offices, etc. In some aspects, DICOM servers 120 can also, or alternatively, be connected to a virtual cloud network (VCN) system and can retrieve DICOM studies and objects from the VCN system for rendering images or providing rendered images with a rendering engine, as well as virtual machines, data centers with different network technologies or architectures according to aspects described herein.

Data repositories 130 can include one or more data storage devices capable of receiving, storing, and providing data related to DICOM information, the management and processing of DICOM information, etc. In some implementations, data repositories 130 can include a database, data center, or another type of data store, data storage system or framework for organizing and storing data. In some aspects, DICOM servers 120 and data repository 130 can be connected via network 150. Platform management terminal 140 can include any type of wired or wireless user device capable of communicating with DICOM servers 120 or data repositories 130 via network 150. Platform management terminal 140 can include a smartphone, tablet computer, laptop computer, desktop computer, or another type of user device capable of enabling a user, operator, administrator, or developer to interact with DICOM servers 120 or the DICOM platform. In some implementations, platform management terminal 140 can be a UE 110. Additionally, or alternatively, platform management terminal 140 can be directly connected to DICOM servers 120. In some implementations, data repositories 130 can be, or can be part of, a VCN system.

DICOM/Non-DICOM sources/destinations 160 can include one or more computing devices, such as a user devices, network devices, or server device capable of receiving, processing, storing, and communicating information via network 150 (e.g., different modalities as described herein). DICOM Non-DICOM sources/destinations 160 can be owned or operated by a particular institution (e.g., a doctor's office, hospital, research institution, government agency, records archive, etc.). DICOM/Non-DICOM sources/destinations 160 can be capable of creating and sending DICOM information (e.g., DICOM studies, DICOM objects, etc.) to DICOM servers 120 for processing or storage. Additionally, or alternatively, DICOM/Non-DICOM sources/destinations 160 can request and receive DICOM information from DICOM servers 120 or form another DICOM/Non-DICOM source/destination. In some implementations, DICOM/Non-DICOM sources/destinations 160 a VCN system capable of receiving, storing, and distributing DICOM/Non-DICOM information to DICOM servers 120 or other DICOM/Non-DICOM sources/destinations 160.

Network 150 can include a single network or multiple networks capable of enabling a connection between devices and different DICOM architectures of a DICOM platform. Network 150 can include one or more wired or wireless networks or network architectures with various interfaces associated with various UE configurations, including client server-side rendering architectures, edge-side rendering architectures, hub server-side rendering architectures, or hub and spoke (spoke) server-side rendering architectures for rendering and displaying medical images associated with DICOM content and/or non-DICOM content or objects. As described herein, a set of DICOM records can be referred to as a DICOM batch or study, and a DICOM record may be referred to as a DICOM object or instance. Network 150 can include a Bluetooth® network, a Wi-Fi network, or a cellular network, the Public Land Mobile Network (PLMN), or a second generation (2G) network, a third generation (3G) network, a fourth generation (4G) network, a fifth generation (5G) network, a sixth generation (6G) network or another type of network. Additionally, or alternatively, network 150 can include a wide area network (WAN), a local area network (LAN), a metropolitan area network (MAN), an ad hoc network, an intranet, the Internet, a virtual network (e.g., a virtual private network (VPN)), a telephone network (e.g., a Public Switched Telephone Network (PSTN)), a Voice over IP (VoIP) network, or a combination of these or other types of networks.

Figure 2:
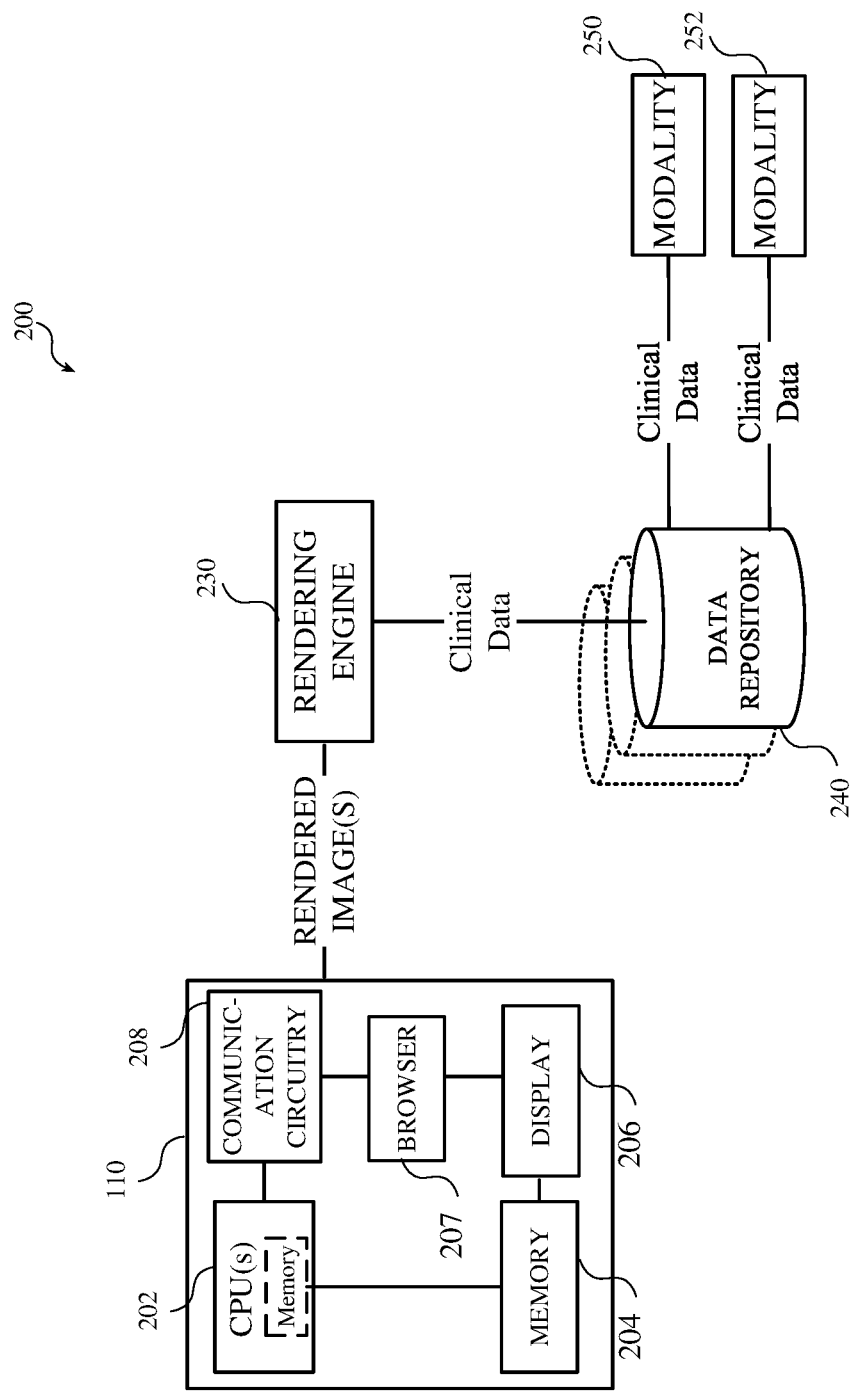
FIG. 2 is a diagram of an example picture archiving and communication system (PACS) for rendering medical images according to one or more implementations described herein.

FIG. 2 illustrates an example configuration of a PACS system 200 that can be configured in part or whole to be integrated in the example environment 100 of FIG. 1 for medical data, images, and DICOM content and/or non-DICOM content or objects. The PACS 200 can be composed of at least a computer/workstation or UE device 110, an archive, data storage, or data store 240, and a rendering engine 230 either located or co-located with the UE 110 on a same premise or local network, or remotely located geographically at another network (e.g., a WAN, hub or central data center) depending on the rendering architecture. The UE device 110 can provide an operating system, software that includes a browser 207 to provide a rendered image in a display 206.

The rendering engine 230 can retrieve or load clinical data (e.g., DICOM data or objects) into memory (e.g., data store/repository 240 or 130) and transform it into a rendered image. The rendering engine 203 can send the images that are rendered by it to the display 206 over the browser 207 for interaction by a medical professional or user of the UE device 110. The browser 207 acts to display the rendered images in the display 206, while the rendering engine renders the images from DICOM content and/or non-DICOM content stored in the data repository 240, which can include, loading, processing, formatting, compressing/decompressing, gathering and interpreting clinical data, etc., for transforming into a viewable image as a rendered image, for example.

The data store or data repository 240 stores clinical data such as radiology exams received from one or more modalities 250, 252 (e.g., radiography (X-ray) machines, computed tomography (CT) scanners, magnetic resonance imaging (MRI) machines, positron emission tomography (PET) scanner, or other radiology equipment), which can operate or be configured as a DICOM/Non-DICOM info source/destination 160 of FIG. 1, for example. The entire data content of an image as well as any metadata associated with it can be stored in the data repository 240, including DICOM content and/or non-DICOM content and objects, as well as any manipulation or interaction with the data performed to the content or objects from the UE device 110, or via a rendered image generated from the clinical data/DICOM content and/or non-DICOM content/objects, for example.

UE device 110 can include any type computing device, such as a wired or wireless user device, that is capable of communicating with a network or other component (e.g., rendering engine 230, data store 240 or a modality 250, 252) over one or more wired or wireless interfaces via communication circuitry 208, which can include radio frequency circuitry with transmitter/receiver circuitry. UE device 110 can include a smartphone, tablet computer, laptop computer, wearable device, etc., including one or more processors or computer processing units (CPUs) 202 with processing circuitry. UE device 110 can alternatively, or additionally, include a desktop computer, a radio-telephone, a personal communications system (PCS) terminal (e.g., that can combine a cellular radio-telephone with data processing and data communications capabilities), a personal digital assistant (PDA) (e.g., that can include a radio-telephone, a pager, Internet/intranet access, etc.), or another type of computation or communication device. UE 110 can further include any variety of peripheral devices (not shown), such as speaker, cameras, external storage devices, etc. UE 110 can include the browser 207 or another type of application or interface capable of accessing a DICOM platform or DICOM data in order to provide a rendered image in the display 206. The UE 110 can also configured differently across multiple UEs of the PACS 200 or the environment 100.

Each UE 110 can include different configurations and components based on a type of architecture being deployed or configured within the PACS. For example, as a hub server-side rendering architecture or a hub and spoke server-side rendering architecture within the PACS, the UE 110 may not include the rendering engine 230, while in an edge architecture or edge-side rendering architecture it may, or be located in a communicatively coupled link in a same local network as a co-located component of the UE 110, for example.

Memory 204 or data store 240 (as well as other memory components discussed herein, e.g., memory, data repository 130, or the like) can comprise one or more machine-readable medium/media including instructions that, when performed by a machine or component herein cause the machine or other device to perform acts of a method, an apparatus or system for communication using multiple communication technologies according to aspects, embodiments and examples described herein. It is to be understood that aspects described herein can be implemented by hardware, software, firmware, or any combination thereof. When implemented in software, functions can be stored on or transmitted over as one or more instructions or code on a computer-readable medium (e.g., the memory described herein or other storage device). Computer-readable media includes both computer storage media and communication media including any medium that facilitates transfer of a computer program from one place to another. A storage media or a computer readable storage device can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or other tangible and/or non-transitory medium, that can be used to carry or store desired information or executable instructions. Also, any connection can also be termed a computer-readable medium.

In an aspect, the PACS 200 can be configured into a hybrid network as an edge-side rendering architecture or a server-side rendering architecture in association with a data center or central server (e.g., a DICOM server 120) as a single server device, group of server devices, or one or more virtual servers. As a server-side rendering architecture, various PACS can include a hub server-side rendering architecture, a hub and spoke server-side rendering architecture, or both in various configurations that are communicatively coupled to or include the same central data center, hub or central server.

Figure 3:
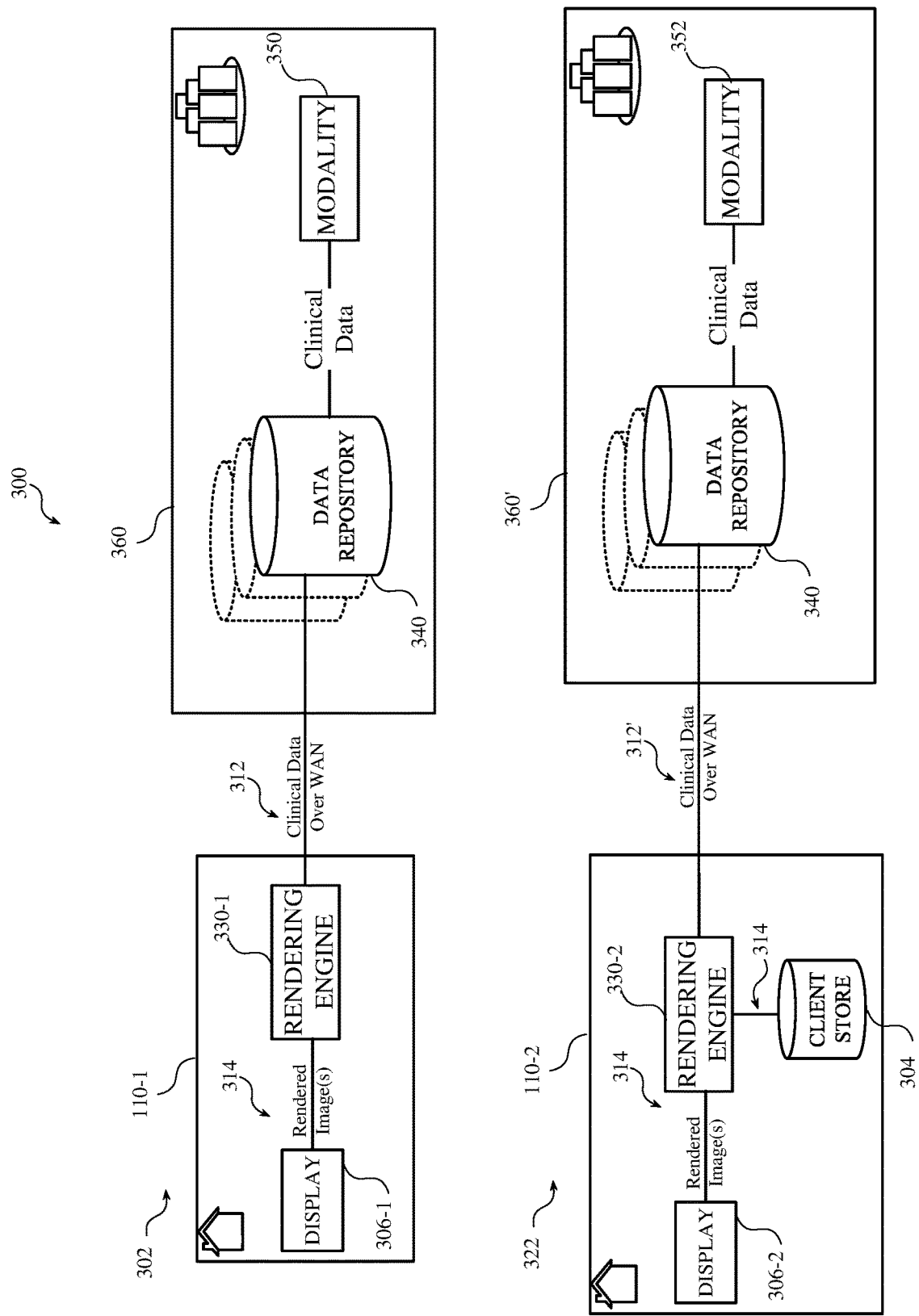
FIG. 3 is a diagram of an example rendering architecture for rendering medical images according to one or more implementations described herein.

FIG. 3 illustrates example client-side rendering architectures 300 including various client-side rendering configurations or as modified edge-side rendering architectures 302, 322 for rendering medical images within a hybrid network. The UEs 110-1 and 110-2 can be co-located or communicatively coupled with local rendering engines 330-1, 330-2, respectively. UE 110-2 can include a local client data store or archive 304 that is configured to locally store clinical data including DICOM content or DICOM objects, as well as other medical data or content. The rendering engines 330-1, 330-2 and client store 304 can respectively communicate among components of the UE 110-1, 110-2 via a LAN interface. For example, the rendering engines 330-1 and 330-2 can communicate one or more rendered images to the displays 306-1, 306-2, respectively. Each of UEs 110 (110-1, 110-2) can be coupled to a DICOM server or central data center 360/360', which can be different or the same DICOM server and include same or different data repositories 340 coupled within the rendering architectures 302, 322 and to modalities 350 and 352.

In these network architecture configurations 302, 322, the rendering engines 330-1, 330-2 can be located on the user's workstation or UEs 110 on a LAN, while the data repository 340 is in a remote data center 360/360' that comprises, includes or is configured as one or more DICOM servers 120. The advantage of these network architectures 302, 322 is that image interaction (e.g., manipulating, annotation, segmentation, augmentation, suggestion selection, slicing, scribble, bounding, extreme clicking, correction, labeling, 3D operations, etc.) can be always dynamic and rapid for a good quality of experience (QoE), as both the displays 306-1, 306-2 and the rendering engines 330-1, 330-2 are local or communicatively coupled in a LAN 314. The disadvantage may be slow initial access to clinical data (time to first image) as the clinical data is sent from the central archive (e.g., data repository 340) from a remote location over an internet connection or WAN via a WAN interface 312, 312', which can be one or different interfaces as indicated by the same reference numeral (e.g., 312) and a primed numeral (e.g., 312').

A PACS (e.g., 100 or 200) can attempt to improve loading time user experience at a UE device 110 so that it is faster by using a small client-side archive or client store 304 that interfaces in a LAN that can include 'pre-fetched' current and prior exams, reports or diagnostic data, including DICOM content/objects and data or other clinical data to produce rendered images in a display 306. However, access to these exams or content could still be delayed due to initial transfer time, alone being an inefficient solution. For example, trying to predict what data exactly the user or a particular UE device 110 will desire to examine at is hard, resulting in either too much data being sent (with additional delays and load on the network) or too little data being sent, forcing the UE device 110 to access on-demand exams from a remote location (e.g., data center 360 as server 120, or other central network hub). In addition, a client-side rendering architecture alone as a network architecture approach does not necessarily scale well for a large number of users or UE devices reading a high volume of exams and medical images in DICOM content causing delays in diagnostic or even errors due to not having timely access to the right prior content.

In an aspect, the data center 360 or 360' can operate as one server 120 to configure a hybrid rendering architecture in order to provide clinical data or DICOM objects to different image rendering architectures configured differently for different UEs 110 based on user preferences or network parameters. For example, the data or DICOM objects can be rendered at the UE 110 locally where the LAN of the UE 110 includes at least its own rendering engine 330 or client store 304 based on a network parameter for maximizing interaction with medical imaging. When network latency is high, the rendering engine located locally to the UE 110 could operate as a browser for providing a rendered image to the display, or within the same LAN separate from the UE 110, or in a virtual machine (VM) within the UE 110, while the clinical data itself is not local and communicated over a WAN via a WAN interface (e.g., a low latency WAN interface). Further, other UEs 110-N could have DICOM objects and clinical data rendered over a hub server-side rendering architecture, or a hub and spoke server-side rendering architecture based on a network parameter as a hybrid rendering environment or PACS.

In case of a disaster recovery situation or other circumstances, if the local side (e.g., client store 304) may be down or otherwise inoperable, the UE 110-2 can connect to the data center or hub server with data repository 340. The configurations and preferences can be the same or similar because they can be synchronized, for example.

Figure 4:
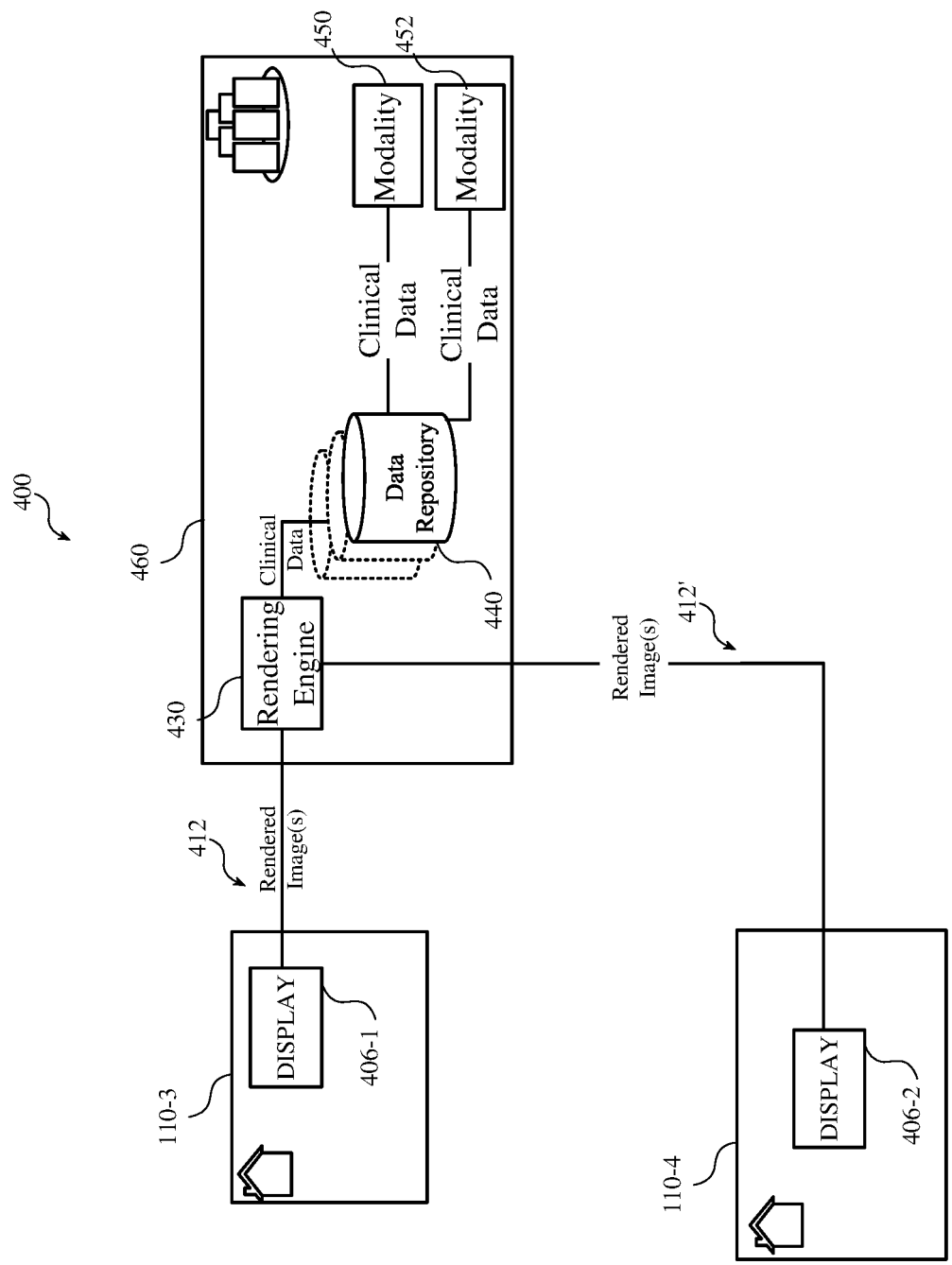
FIG. 4 is a diagram of an example server-side rendering architecture for rendering medical images according to one or more implementations described herein.

FIG. 4 illustrates an example server-side rendering architecture as a hub server-side rendering architecture including various configured components for rendering medical images. UEs 110-3 and 110-4 include displays 406-1 and 406-2 similarly as in previous figures that are communicatively coupled over a WAN interface 412, 412' to a data center 460 that is remotely located from the respective UEs. The data center 460 includes a rendering engine 430, one or more data repositories 440, and one or more modalities 450, 452 coupled thereto, which collectively or in part can operate as a DICOM server 120 or a hub server.

An advantage of the rendering engine 430 being located in the data center 460 is that a time to first image is excellent, for either the current or prior exams for a particular patient, as all the clinical data is loaded in the data center 460 with the data repository 440 without the need for a UE 110-3 or 110-4 to store, process and load large volumes of DICOM objects of medical images for rendering in display 406-1, 406-2 thereafter. By enabling the data to be loaded and rendered at the data center 460 with remote resources relative to the UE 110-3, 110-4, this ensures that only data for any particular diagnostic is loaded, further resulting in efficient network resource usage. This also means that image interaction performance with a medical image could be affected by network conditions or parameters (latency, geographical proximity to a data location, or a usage pattern of a UE) in providing rendered images over a WAN interface 412, 412', resulting potentially in a frustrating user experience on slow networks, but quick viewing of a rendered image for interaction within faster network connections.

Figure 5:
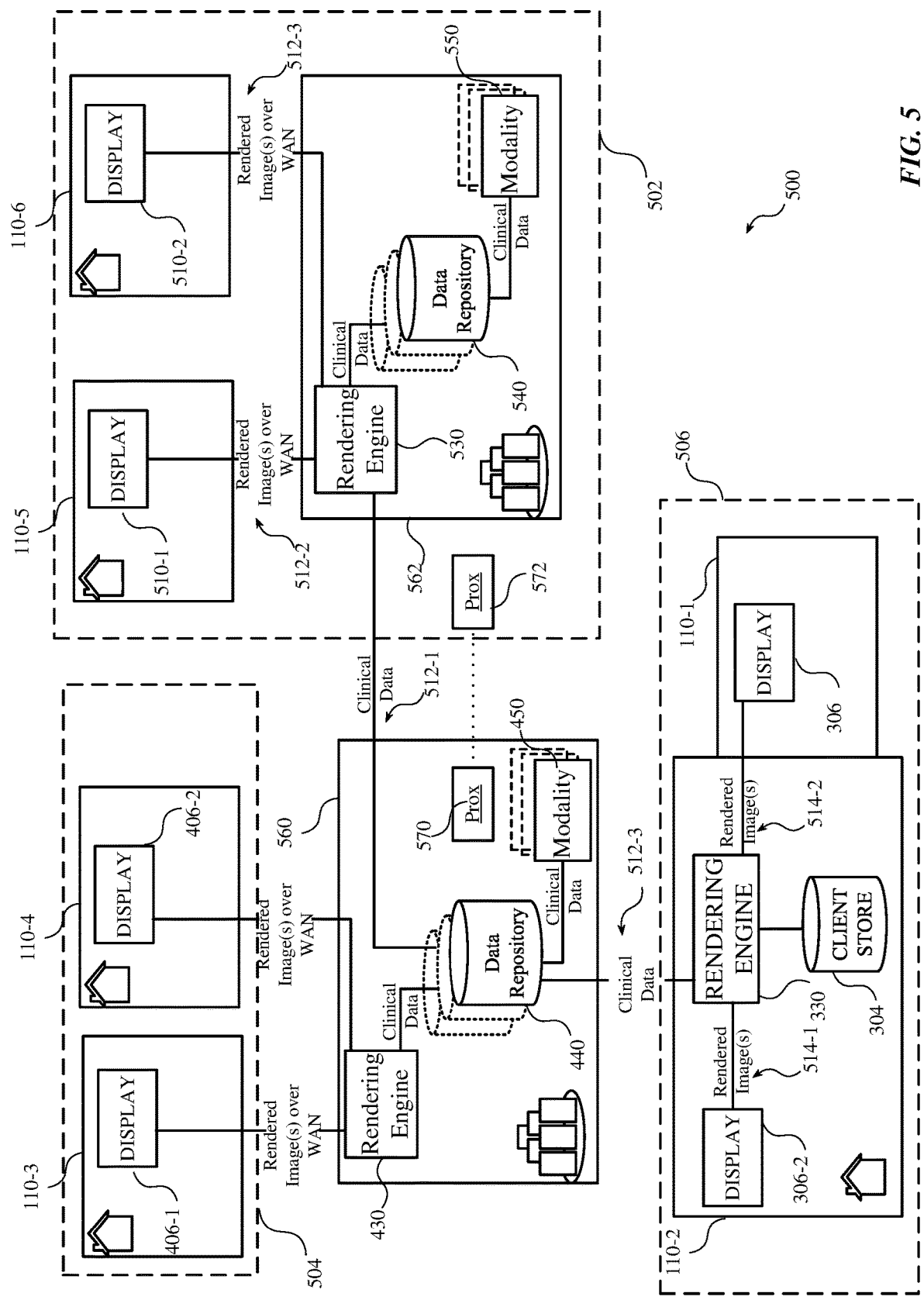
FIG. 5 is a diagram of an example hybrid server-side rendering architecture for rendering medical images according to one or more implementations described herein.

FIG. 5 illustrates a hybrid rendering server system 500 as a PACS utilizing different server-side rendering architectures and an edge-side rendering architecture. The server-side rendering architectures can include a hub and spoke server-side rendering architecture 502 and a hub server-side rendering architecture 504. The server system 500 further includes a client/edge-side rendering architecture 506. Some of the differences between a server-side rendering architecture (e.g., 502, 504) is the location of the rendering process, which includes transforming clinical data into rendered images sent to a display for user interaction. This rendering process involves a rendering engine (e.g., 330, 430, 530) including one or more processors, software, firmware, or virtual machines to convert clinical information and associated file information (e.g., data compression, DICOM objects, pixel data, metadata, associated formatting and other data) into a viewable and editable version for display via a browser for a medical image. These processes can be complex and time consuming when large volumes of 3D image data are being transformed from various types of modalities (including X-ray images, MRIs, PETs, CAT scans, etc.). Thus, instead of a UE device waiting to have each and every medical image rendered from clinical data and then displayed, in a server-side architecture the rendering can be done remotely at the data center 560 or 460, for example, and then provided to the UE device (e.g., 110-3, 110-4) without the need to wait for rendering delays to process, including downloading or uploading of clinical data and transforming the data into a rendered image until being able to meaningfully interact with the rendered image as a medical image for diagnostic. However, when network parameters are at or above a (pre)determined or defined threshold (e.g., with latency), interaction with the rendered image can include jitter, along with a low smoothness of interactive visualization and a lower quality of experience by the user or UE device.

Radiologists and clinicians selecting a PACS may be forced as a practice group to choose between either client-side or server-side rendering architectures, without an ability to individually choose which approach is more appropriate for the particular practice needs and networking parameters, such as a user location vs a data location and usage patterns. The server system or device 500 configures a central hub as a central data center 560 to serve multiple different rendering architectures in deployment. Alternatively, or additionally, the rendering architectures can be configured dynamically based on user needs or network parameters.

Similar to the data center 460 of FIG. 4, the central data center 560 comprises a rendering engine 430 with software, hardware, firmware or VM-ware components that enable rendering of images from the clinical data stored in the data repository 440, either from one or more modalities 450 coupled to the central hub or from more remote modalities (e.g., modalities 550) of a different geographical region or spoke of the hub (central data center 560) architecture via interface 512 (e.g., a WAN interface of a WAN network or the other remote link).

The hybrid rendering server system 500 includes a hub and spoke server-side rendering architecture 502. A regional data center 562 is communicatively coupled to the central data center 560 via a clinical data WAN interface 512-1, for example, and includes rendering engine 530, data repository 540 and any number of modalities 550. Any number of UE devices (e.g., UEs 110-5, 110-6) for example, can comprise displays 510-1 and 510-2 for displaying rendered images received over WAN interfaces 512-2, 512-3, respectively.

The regional data center 562 can operate as a spoke in relation to the central data center 560 as a server hub, and operate as a separate database for a particular geographic region, for example. Any number of spokes can be configured as a regional data centers including DICOM servers 120 with data repository 540 and connected modalities 550 to serve a particular organization or region center while operating with the same web server front end and applications for DICOM medical imaging as the hub or central data center 560 as a multi-terminal web application. From the point of view of the user (e.g., UE 110-5 or 110-6), imaging applications and rendering can be the same experience to UE 110-3 or 110-4. The data received at the data repository 440 via interface 512-1 can be data shared from data repository 540 and vice versa with same application capabilities, despite being connected to the central data center (hub) 560 or the hub and spoke server-side rendering architecture 502 as a regional spoke with the hub 560 for example. From a user point of view a same quality of experience can be observed with regards to the user's preferences, interactivity, or any other parameter. A difference can be found in the actual medical data being stored because the hub or central data center 560 contains the whole enterprise data and the remote spoke does not necessarily have any different data. In this particular architecture, the UE devices 110-5 and 110-6 do not have to load and render images but instead received the medical images already loaded and rendered from clinical data and DICOM objects in order to achieve a good degree of latency and interactivity with the ability to peak into or view medical images from the enterprise data and bring studies which he would like to see on a local instance, for example.

In other aspects, proxy adapters 570, 572 can be utilized at the central data center (hub) 560 or the regional data center 562 as a spoke to hub 560 to transfer medical studies between data repositories and provide a way for UEs to examine data, query, search and retrieve the study into a local memory (e.g., memory 204) or other local data store to render them regionally or from local memory on the spoke. The downloading of clinical data can go through various phases. For example, initially only the addresses of a medical study with clinical data can be downloaded, which in general could be about 3 to 10 percent of a medical study with clinical data on a patient or patients for diagnosis, which can enable understanding and processing of what the data is. This allows the users to engage in all the logical behind a specific modality 550 or 450 and configure hanging protocols and organize the viewing with the browser space accordingly. Afterwards, downloading of pixel data can occur, which is usually downloaded in a formatted logic with background loading to process through all the frames and data for DICOM objects. Further, adaptive loading may be enabled if the medical study has a multiple series and the user decides to switch between them or goes through particular users so they download and make data request so it changes the order, the sequencing of the downloaded data and adapts to the user intentions. This could enhance the experience for the users, in cases where they are not patient and would like to glimpse into data without waiting for a full download of a study. Optionally, when the data is being pulled from the enterprise hub or central data center 560 the data can be stopped locally, cached on the user machines or UEs, so the next time that the user wants to examine the same study it would be available on the same computer.

Similar to the hub and spoke server-side architecture 502, the hub server-side architecture 504 can operate to have rendered images received in displays 406-1, 406-2 when the network parameter(s) (e.g., latency, geographical location/proximity to hub, usage pattern/behavior) is below a (pre)determined threshold, or otherwise satisfies a (pre)determined threshold. This enables each UE 110-3, 110-4 (as well as 110-5, 110-6) to take advantage of better network conditions and maintain high degree of interactivity without compromises smoothness when editing and manipulating of medical images. The UEs 110-3 thru 110-6 can then receive rendered images over a low latency WAN connection in order to interact or edit the medical images for diagnostic without wait time for loading and rendering processes.

For the edge-side rendering architecture 506, the user of the UE 110-1 or 110-2 could have a network condition or parameter that is greater than or otherwise satisfying a desired threshold (e.g., for latency) such that the user may accept waiting for clinical data to be transferred or loaded onto the client store 304 before the image is to be rendered, and then rendered by the rendering engine 330 for display with a medical image at display 306 or 306-2. The browsers of both UE 110-1 and 110-2 display the rendered images, rather than the clinical data or DICOM objects themselves from which the images are rendered via the local rendering engine 330. The clinical data or DICOM objects can be communicated to the rendering engine 330 from the data repository 440 over a WAN interface, for example, and the rendered images provided to the displays 306-2 or 306 are provided via a LAN interfaces 514-1, 514-2 or other local connection within the edge-side server rendering architecture 506.

In the edge-side server rendering architecture 506, a trade-off can be preferred and configured in deployment or configuration in order to gain a smooth interaction and avoid any jitter or lack of smoothness during interaction/editing of the medical image for patient diagnosis when latency is higher such as at geographical locations where network latency may be greater. In addition, or alternatively, the usage pattern of the user of the UE devices may be such that the time for rendering images locally may enable other medical opportunities or opportunity cost to be cut, until a complete and smooth interaction of the medical images becomes manageable to return attention to.

In case of a disaster recovery situation or other circumstances, if the local side of edge-side rendering architecture 506 components (e.g., the client store 304) or any of the components of the regional data center 562 operating as a spoke of the hub may be down or otherwise inoperable, the UEs 110 can connect to the data center or hub server with data repository 440 to obtain clinical data or rendered images. The configurations and preferences can be the same or similar because they can be synchronized, for example. Data can be replicated from one data store to another depending on immediate circumstances or emergency cases. This capability can be configured at deployment or set dynamically by setting a database as a master data base or master data repository and updated. For example, the master or hub central data center 560 can control user accounts and preferences in order to be replicated at any local side or local client store/regional data repository. The users thus can configured a master copy or a proxy database on the hub side, in a one to one association, or as a one to many association between hub and spoke(s), in which a spoke can be installed on a particular modality or machine, or otherwise configured, for example.

In another aspect, the hybrid rendering server system 500 can operate to configure different modes so that software or DICOM firmware can operate according to different rendering architectures. The hub server or central data center 560 can instruct each spoke (e.g., 562 or other spoke/architecture) to operate in a local mode or in a proxy mode so that all data requests can be directed to the central data center (hub) 560 while maintaining the ability to use a local archive (e.g., data repository 540) with automated or on-demand prefetching abilities, depending on user preferences. The direction can be determined by the user or UE 110 to establish which data repository operates as a master or hub and which operates as a spoke for these purposes, for example.

Different modality modes thus can be configured according to a hub server-side rendering architecture 504, a hub and spoke server-side rendering architecture 502 or edge-side rendering architecture 506. At UEs 110-3, 110-4, web browsers are connecting to the hub as central data center 560 as remote users. The rendering engine 430 of the central data center 560 loads the clinical data from its archive or data repository 460 as it is defined, formatted, or configured by modalities 450 to perform server-side rendering where each UE 110-3, 110-4 receives a smaller amount of data for viewing a particular image relative to the clinical data accessed for generating or rendering the rendered image itself. Additionally, the hub and spoke server-side rendering architecture 502 on the right of FIG. 5 configures the regional data center(s) 562 so that each spoke has its own archive or data repository 540 in synchronization or replication with the central data center (hub) 560. The spokes can thus view their own data and the hub data. As discussed above, this kind of proxy mode of operation can be valuable in disaster situation where the server or regional data center 562 can still function locally, and users can connect to the spoke rendering engine 530 in order to still maintain the same speed and interaction with medical images in each study. In an edge-side rendering architecture 506 by default a single remote user or UE 110-2, or 110-1 can operate with its own rendering engine 330 as opposed to a full client server solution by rendering architecture 502. The UE 110-1, and 110-2 still have their own browser for purposes of viewing rendered medical images, but the connection is local, except that the software is configured to run into edge mode which is proxying the data to the central data center 560 where the UE 110-1, or 110-2 can still cache some data locally, which may or may not be replicated to the hub server or central data center 560. UEs 110-1 and 110-2 thus would have no difference of experience. For example, three radiologists on the same premises or in the same housing via UEs 110-1 and 110-2 can connect to one another or one or more components in the local network or system, utilizing the same rendering engine 330, for example, via local connection(s) or LAN interface 514-1 or 514-2.

Figure 6:
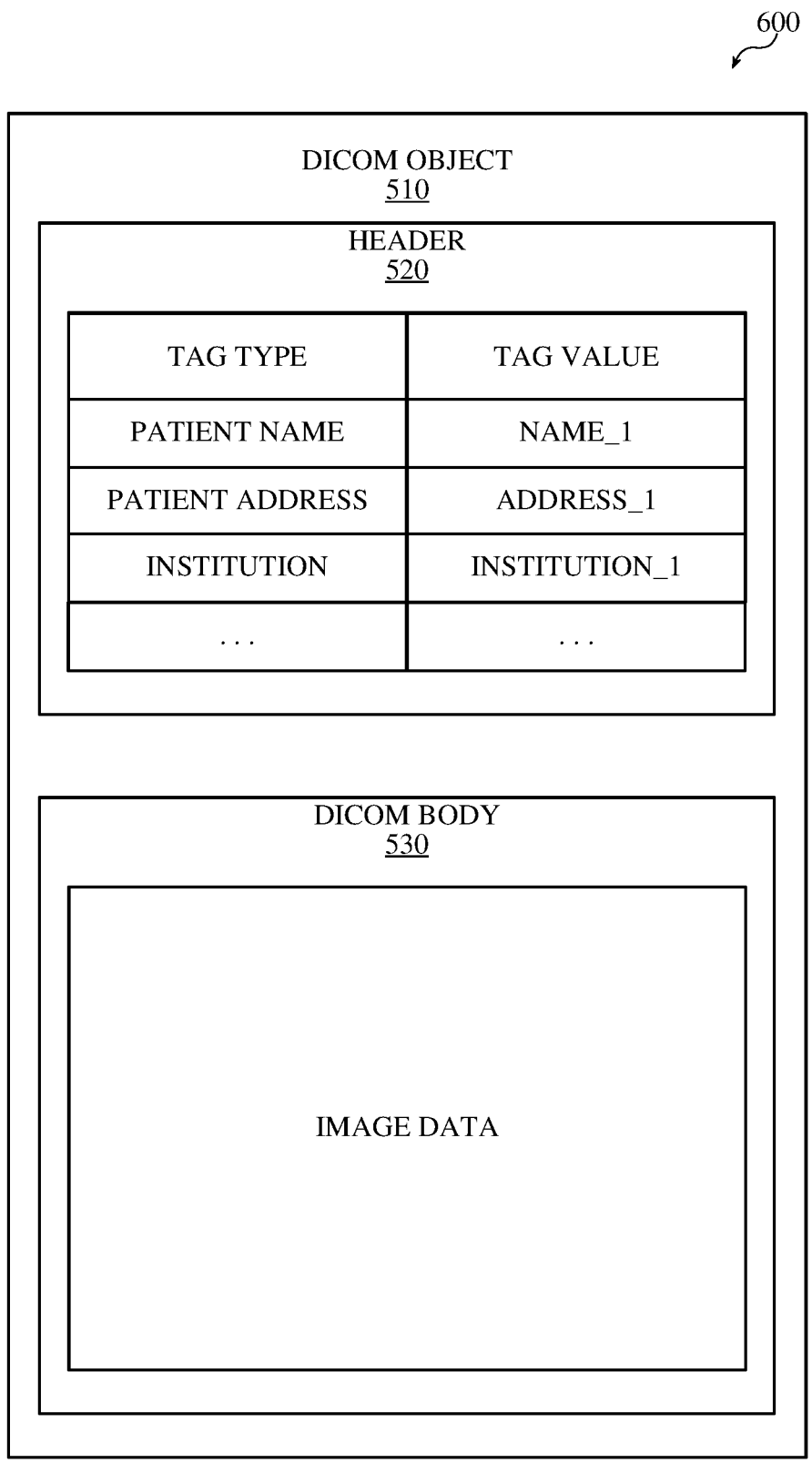
FIG. 6 is a diagram of an example of a DICOM object according to one or more implementations described herein.

FIG. 6 is a diagram of an example 600 of a DICOM object 610 according to one or more implementations described herein. As shown, DICOM object 610 include a header 620 and DICOM body 630. Header 620 may include multiple keys or tags (e.g., patient name, patient address, instruction, etc. Each type of tag may include a corresponding value, such as NAME 1, ADDRESS 1, INSTITUTION 1, etc. DICOM body 630 may include one or more images, or another type of medical information, associated with DICOM object 610. Examples of DICOM body 630 may include an x-ray image, an MRI, and/or one or more other types of images or medical records.

Figure 7:
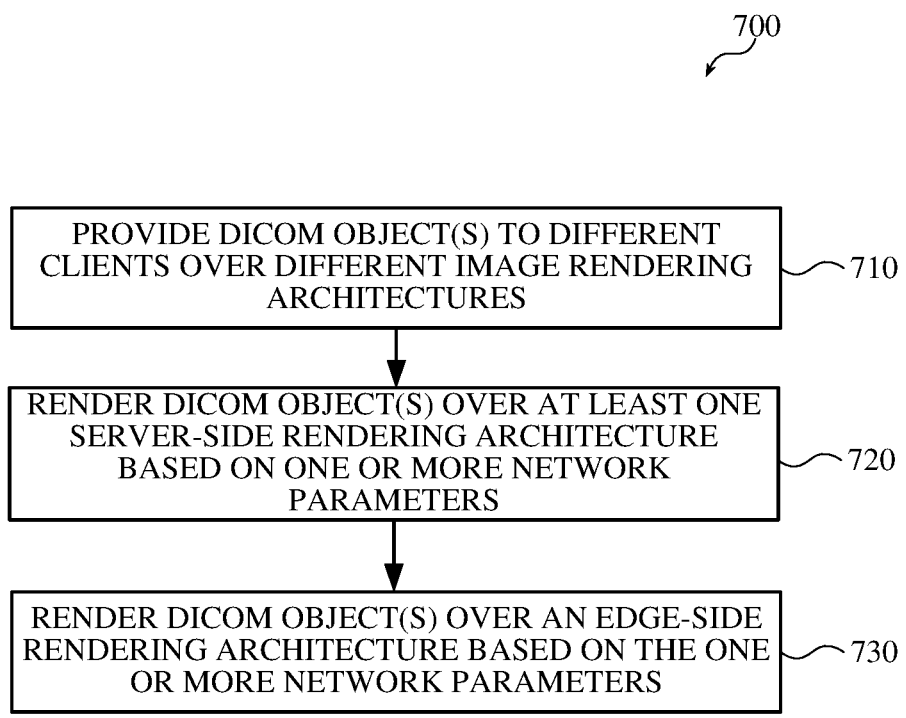
FIG. 7 is a diagram of an example process flow for configuring a hybrid server rendering architecture according to one or more implementations or aspects described herein.

FIG. 7 illustrates an example process flow 700 for a central server as a hybrid enterprise architecture. The process flow 700 initiates at 710 with providing, via one or more processors of the server, one or more DICOM objects to different clients over different image rendering architectures. At 720, the process flow further comprises rendering the one or more DICOM objects over at least one server-side rendering architecture based on one or more network parameters (e.g., network latency, geographical location, usage patterns or desired tradeoffs in deployment). At 730, the process flow further comprises rendering the one or more DICOM objects over an edge-side rendering architecture based on the one or more network parameters.

In an aspect, the process flow 700 can further include rendering the DICOM objects from a central rendering engine directly to a first set of user devices over one or more first WAN interfaces. The DICOM objects can be rendered as rendered images to a second set of user devices also through an auxiliary or regional rendering engine in a regional data center as a part of the at least one server-side rendering architecture when the one or more network parameters (e.g., network latency) are below a threshold, the auxiliary rendering engine is coupled to the second set of user devices through one or more second WAN interfaces and to a central archive connected to the central rendering engine via another wireless interface or WAN. Additionally, DICOM objects can be provided to a third set of user devices from the central archive connected to the central rendering engine via another rendering engine connected to the third set of user devices as a part of the edge-side rendering architecture when the one or more network parameters are at or above the threshold to enable the another auxiliary rendering engine to render the DICOM objects locally in a display of the third set of user devices. The second set of user devices coupled to the at least one server-side rendering architecture can render the one or more DICOM objects from at least one of: the auxiliary rendering engine with an associated archive, or the central rendering engine, where the third set of user devices receives information only from the central rendering engine.

DICOM objects can be provided over a PACS server for the rendering of medical images via the edge-side rendering architecture when the one or more network parameters comprise a latency that is at or above the threshold, and via a rendering engine coupled to a regional archive to render the medical images in a display of one or more user devices when the latency is below the threshold.

In an aspect, the server rendering architecture with the central data center can enroll an additional spoke architecture to a central hub based on the at least one server-side rendering architecture, or the edge-side rendering architecture with licensing being automated. The additional spoke architecture can be instructed to operate in a standard mode, local mode or a proxy mode with the central hub, based on one or more of the network parameters.

Further, a direction of data replication can be established that includes associated data of the DICOM objects, user preferences, or other configuration items between a central hub of the server-side rendering architecture and one or more spokes of the central hub from the server-side rendering architecture or the edge-side rendering architecture. The server-side rendering architecture can include at least one of: a hub serving-side rendering architecture or a hub and spoke server-side rendering architecture.

Figure 8:
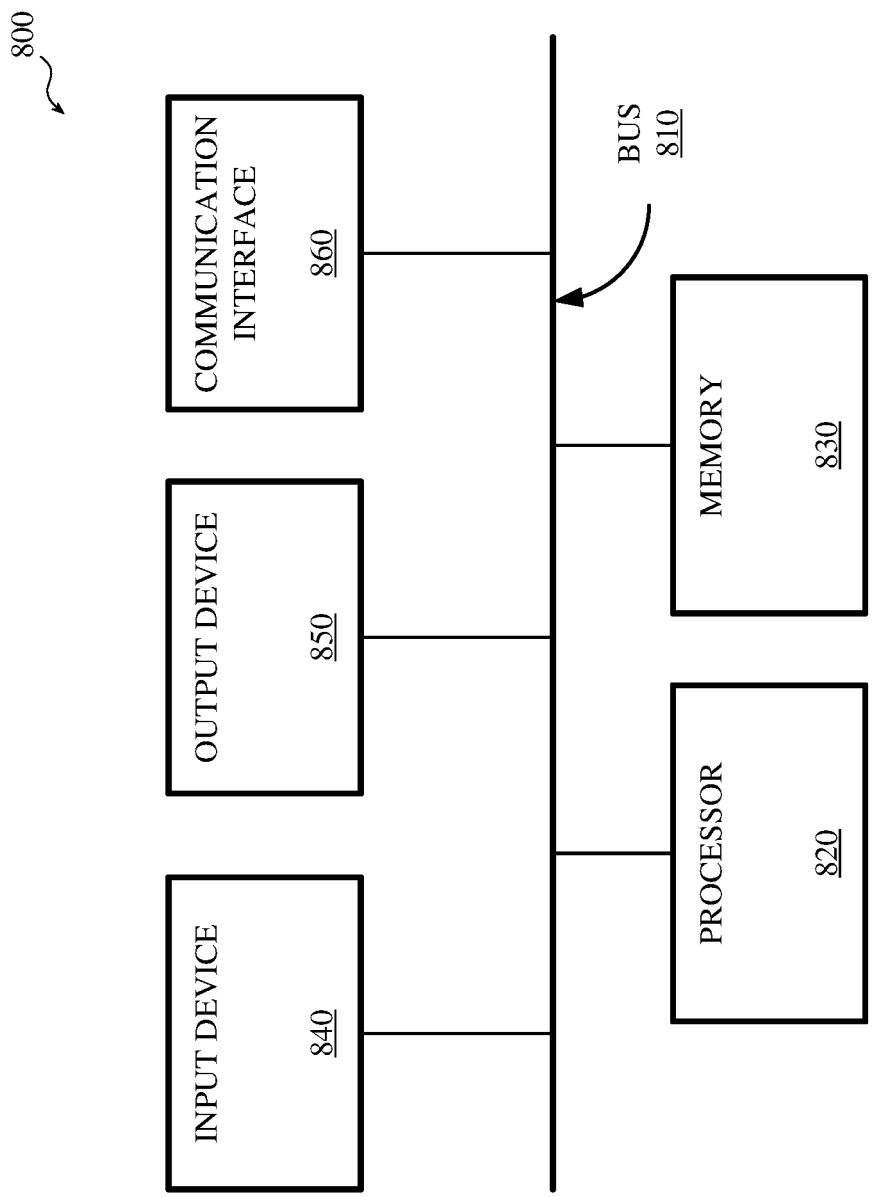
FIG. 8 is a diagram of example components of a device that may be used within environment of FIG. 1.

FIG. 8 is a diagram of example components of a device 800 that may be used within environment 100 of FIG. 1. Device 800 may correspond to UE 110, DICOM servers 120, data repository 130, platform management terminal 140, and/or DICOM/Non-DICOM information source/destination 160. Each of UE 110, DICOM servers 120, data repository 130, platform management terminal 140, and/or DICOM/Non-DICOM information source/destination 160 may include one or more of devices 800 and/or one or more of the components of device 800.

As depicted, device 800 may include bus 810, processor 820, memory 830, input device 840, output device 850, and communication interface 860. However, the precise components of device 800 may vary between implementations. For example, depending on the implementation, device 800 may include fewer components, additional components, different components, or differently arranged components than those illustrated in FIG. 8.

Bus 810 may permit communication among the components of device 800. Processor 820 may include one or more processors, microprocessors, data processors, co-processors, network processors, application-specific integrated circuits (ASICs), controllers, programmable logic devices (PLDs), chipsets, field-programmable gate arrays (FPGAs), or other components that may interpret or execute instructions or data. Processor 820 may control the overall operation, or a portion thereof, of device 800, based on, for example, an operating system (not illustrated), and/or various applications. Processor 820 may access instructions from memory 830, from other components of device 800, or from a source external to device 800 (e.g., a network or another device).

Memory 830 may include memory and/or secondary storage. For example, memory 830 may include random access memory (RAM), dynamic RAM (DRAM), read-only memory (ROM), programmable ROM (PROM), flash memory, or some other type of memory. Memory 830 may include a hard disk (e.g., a magnetic disk, an optical disk, a magneto-optic disk, a solid state disk, etc.) or some other type of computer-readable medium, along with a corresponding drive. A computer-readable medium may be defined as a non-transitory memory device. A memory device may include space within a single physical memory device or spread across multiple physical memory devices.

Input device 840 may include one or more components that permit a user to input information into device 800. For example, input device 840 may include a keypad, a button, a switch, a knob, fingerprint recognition logic, retinal scan logic, a web cam, voice recognition logic, a touchpad, an input port, a microphone, a display, or some other type of input component. Output device 850 may include one or more components that permit device 800 to output information to a user. For example, output device 850 may include a display, light-emitting diodes (LEDs), an output port, a speaker, or some other type of output component.

Communication interface 860 may include one or more components that permit device 800 to communicate with other devices or networks. For example, communication interface 860 may include some type of wireless or wired interface. Communication interface 860 may also include an antenna (or a set of antennas) that permit wireless communication, such as the transmission and reception of radio frequency (RF) signals.

As described herein, device 800 may perform certain operations in response to processor 820 executing software instructions contained in a computer-readable medium, such as memory 830. The software instructions may be read into memory 830 from another computer-readable medium or from another device via communication interface 860. The software instructions contained in memory 830 may cause processor 820 to perform one or more processes described herein. Alternatively, hardwired circuitry may be used in place of, or in combination with, software instructions to implement processes described herein. Thus, implementations described herein are not limited to any specific combination of hardware circuitry and software.

Examples herein can include subject matter such as a method, means for performing acts or blocks of the method, at least one machine-readable medium including executable instructions that, when performed by a machine (e.g., a processor (e.g., processor, etc.) with memory, an application-specific integrated circuit (ASIC), a field programmable gate array (FPGA), or the like) cause the machine to perform acts of the method or of an apparatus or system for concurrent communication using multiple communication technologies according to implementations and examples described.

A first example, is an apparatus to be employed in a server, comprising: a memory; and one or more processors configured, when executing instructions stored in the memory, to provide digital imaging and communications in medicine (DICOM) objects to different image rendering architectures; render the DICOM objects over at least one of: a hub server-side rendering architecture, or a hub and spoke server-side rendering architecture based on one or more network parameters; and render the DICOM objects over an edge-side rendering architecture based on the one or more network parameters.

A second example can include the subject matter of the first example, wherein the hub server-side rendering architecture comprises a central hub that includes a central rendering engine coupled to a central archive that stores the DICOM objects from a modality, and a first user device coupled to the central hub via a first wide area network (WAN) interface, wherein the central rendering engine is configured to render the DICOM objects to a first display of the first user device via the first WAN interface.

A third example can include the subject matter of the first thru second examples, wherein the hub and spoke server-side rendering architecture comprises a regional rendering engine that is coupled to the central archive via a clinical data interface and to a regional archive that stores at least a portion of the DICOM objects of the central archive and other DICOM objects from another modality coupled to the regional archive, wherein the regional rendering engine is configured to render the at least the portion of the DICOM objects or the other DICOM objects to a second display of a second user device over a second WAN interface.

A fourth example can include the subject matter of the first thru third examples, wherein the one or more processors are further configured to provide the DICOM objects in a picture archiving and communication system (PACS) for rendering medical images via the edge-side rendering architecture in response to the network parameter comprising a latency that is at or above the threshold, wherein the edge-side rendering architecture comprises a local rendering engine, coupled to the regional archive and the central archive, that renders the medical images in a third display of a third user device.

A fifth example can include the subject matter of the first thru fourth examples, wherein the one or more processors are further configured to configure the hub server-side rendering architecture, the hub and spoke server-side rendering architecture, or the edge-side rendering architecture based on at least one of: a latency, a geographical proximity to a data location, or a usage pattern of a client device satisfying a threshold.

A sixth example can include the subject matter of the first thru fifth examples, wherein the one or more processors are further configured to: enroll an additional spoke architecture to a central hub based on the hub server-side rendering architecture, the hub and spoke server-side rendering architecture, or the edge-side rendering architecture with licensing; and instruct the additional spoke architecture to operate in a standard mode, local mode or a proxy mode with the central hub, based on the one or more network parameters.

A seventh example can include the subject matter of the first thru sixth examples, wherein the one or more processors are further configured to: establish a direction of data replication including associated data of DICOM objects, user preferences, or other configuration items between a central hub and one or more spokes of the central hub from the hub server-side rendering architecture, the hub and spoke server-side rendering architecture, or the edge-side rendering architecture.

An eighth example is a system of a server comprising: a central hub comprising a memory and one or more processors; at least one of: a hub server-side rendering architecture or a hub and spoke server-side rendering architecture coupled to the central hub; and an edge-side rendering architecture coupled to the central hub, wherein the one or more processors are configured to: provide digital imaging and communications in medicine (DICOM) objects over the at least one of: the hub server-side rendering architecture, or the hub and spoke server-side rendering architecture based on one or more network parameters; and provide the DICOM objects over the edge-side rendering architecture based on the one or more network parameters.

A ninth example can include the eighth example, further comprising: a central archive of the central hub comprising the DICOM objects and associated clinical data received from one or more modalities coupled to the central archive; and a central rendering engine of the central hub that stores the associated clinical data into the central archive, and renders the associated clinical data with the DICOM objects to a user browser via a first wide area network (WAN) interface for interaction with a first user device in the hub server-side rendering architecture.

A tenth example can include the eighth or tenth example, wherein the hub and spoke server-side rendering architecture comprises: a regional archive configured to store at least a part of the DICOM objects and other DICOM objects with associated regional clinical data from one or more regional modalities coupled to the regional archive; and a regional rendering engine that provides the other DICOM objects and the associated regional clinical data to the regional archive, that provides the associated regional clinical data to the central archive to be a part of the associated clinical data, and transfers the associated regional clinical data to a browser of a second user device in the hub and spoke server-side rendering architecture based on rendering by the central rendering engine.

An eleventh example can include any one or more of the eighth through tenth examples, wherein the edge-side rendering architecture comprises: an edge rendering engine over the edge-side rendering architecture connected to a third user device configured to render a portion of the associated clinical data and the one or more DICOM objects to a third user display or a third user browser for interaction to the one or more DICOM objects by the third user device without rendering by the central rendering engine.

A twelfth example can include any one or more of the eighth through eleventh examples, wherein the one or more processors are further configured to: render the DICOM objects from a central rendering engine directly to a first set of user devices over one or more first WAN interfaces; render the DICOM objects to a second set of user devices through an auxiliary rendering engine in a regional data center as a part of the hub and spoke server-side rendering architecture when the one or more network parameters are below a threshold, the auxiliary rendering engine is coupled to the second set of user devices through one or more second WAN interfaces and to a central archive connected to the central rendering engine via another WAN interface; and provide the DICOM objects to a third set of user devices from the central archive connected to the central rendering engine via another auxiliary rendering engine connected to the third set of user devices as a part of the edge-side rendering architecture when the one or more network parameters are at or above the threshold to enable the another auxiliary rendering engine to render the DICOM objects locally in a display of the third set of user devices.

A thirteenth example can include any one or more of the eighth through eleventh examples, wherein the hub and spoke server-side rendering architecture comprises a higher bandwidth than the edge-side rendering architecture, and wherein the edge-side rendering architecture comprises a same quality of experience (QoE) as the hub and spoke server-side architecture for user devices rendering and interacting with the DICOM objects.

A fourteenth example can include any one or more of the eighth through thirteenth examples, wherein the one or more processors are further configured to configure the hub server-side rendering architecture, the hub and spoke server-side rendering architecture, or the edge-side rendering architecture based on at least one of: a latency, a geographical proximity to a data location, or a usage pattern of a client device satisfying a threshold.

A fifteenth example can include a method performed by a server, comprising: providing, via one or more processors of the server, one or more digital imaging and communications in medicine (DICOM) objects to different clients over different image rendering architectures; providing the one or more DICOM objects over at least one server-side rendering architecture based on one or more network parameters; and providing the one or more DICOM objects over an edge-side rendering architecture based on the one or more network parameters.

A sixteenth example can include the fifteenth example, further comprising: rendering the DICOM objects from a central rendering engine directly to a first set of user devices over one or more first WAN interfaces; rendering the DICOM objects to a second set of user devices through an auxiliary rendering engine in a regional data center as a part of the at least one server-side rendering architecture when the one or more network parameters are below a threshold, the auxiliary rendering engine is coupled to the second set of user devices through one or more second WAN interfaces and to a central archive connected to the central rendering engine via another wireless interface; and providing the DICOM objects to a third set of user devices from the central archive connected to the central rendering engine via another auxiliary rendering engine connected to the third set of user devices as a part of the edge-side rendering architecture when the one or more network parameters are above the threshold to enable the another auxiliary rendering engine to render the DICOM objects locally in a display of the third set of user devices.

A seventeenth example can include any one or more of the fifteenth through sixteenth examples, wherein the second set of user devices coupled to the at least one server-side rendering architecture renders the one or more DICOM objects from at least one of: the auxiliary rendering engine with an associated archive, or the central rendering engine, and the third set of user devices receives information only from the central rendering engine.

A eighteenth example can include any one or more of the fifteenth through seventeenth examples, further comprising: providing the one or more DICOM objects in a picture archiving and communication system (PACS) for rendering medical images via the edge-side rendering architecture when the one or more network parameters comprise a latency that is at or above a threshold, and via a rendering engine coupled to a regional archive to render the medical images in a display of one or more user devices when the latency is below the threshold.

An nineteenth example can include any one or more of the eighth through eighteenth examples, further comprising: enrolling an additional spoke architecture to a central hub based on the at least one server-side rendering architecture, or the edge-side rendering architecture with licensing; and instructing the additional spoke architecture to operate in a standard mode, local mode or a proxy mode with the central hub, based on the one or more network parameters.

An twentieth example can include any one or more of the eighth through nineteenth examples, further comprising establishing a direction of data replication including associated data of the DICOM objects, user preferences, or other configuration items between a central hub of the server-side rendering architecture and one or more spokes of the central hub from the server-side rendering architecture or the edge-side rendering architecture, wherein the server-side rendering architecture comprises at least one of: a hub serving-side rendering architecture or a hub and spoke server-side rendering architecture.

The above description of illustrated examples, implementations, aspects, etc., of the subject disclosure, including what is described in the Abstract, is not intended to be exhaustive or to limit the disclosed aspects to the precise forms disclosed. While specific examples, implementations, aspects, etc., are described herein for illustrative purposes, various modifications are possible that are considered within the scope of such examples, implementations, aspects, etc., as those skilled in the relevant art can recognize.

In this regard, while the disclosed subject matter has been described in connection with various examples, implementations, aspects, etc., and corresponding Figures, where applicable, it is to be understood that other similar aspects can be used or modifications and additions can be made to the disclosed subject matter for performing the same, similar, alternative, or substitute function of the subject matter without deviating therefrom. Therefore, the disclosed subject matter should not be limited to any single example, implementation, or aspect described herein, but rather should be construed in breadth and scope in accordance with the appended claims below.

In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations. In addition, while a particular feature may have been disclosed with respect to only one of several implementations, such feature may be combined with one or more other features of the other implementations as may be desired and advantageous for any given application.

As used herein, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. Furthermore, to the extent that the terms "including", "includes", "having", "has", "with", or variants thereof are used in either the detailed description or the claims, such terms are intended to be inclusive in a manner similar to the term "comprising." Additionally, in situations wherein one or more numbered items are discussed (e.g., a "first X", a "second X", etc.), in general the one or more numbered items can be distinct, or they can be the same, although in some situations the context may indicate that they are distinct or that they are the same.

It is well understood that the use of personally identifiable information should follow privacy policies and practices that are generally recognized as meeting or exceeding industry or governmental requirements for maintaining the privacy of users. In particular, personally identifiable information data should be managed and handled to minimize risks of unintentional or unauthorized access or use, and the nature of authorized use should be clearly indicated to users.

What is claimed is:

1. A hybrid picture archiving and communication system (PACS) comprising:
   a hub server-side rendering architecture comprising:
      a central hub that includes a central rendering engine, a central archive that stores digital imaging and communication in medicine (DICOM) objects from a first modality coupled to the central archive, and a first proxy adapter; and
      a first user device coupled to the central hub via a first wide area network (WAN) interface, wherein the central rendering engine is configured to render the DICOM objects to a first display of the first user device via the first WAN interface;
   a hub and spoke server-side rendering architecture comprising:
      at least one spoke that includes a regional rendering engine, a regional archive that stores at least a portion of the DICOM objects of the central archive and other DICOM objects from a second modality coupled to the regional archive, and a second proxy adapter, wherein the regional rendering engine is coupled to the central archive via a clinical data interface; and
      a second user device coupled to the at least one spoke via a second WAN interface, wherein the regional rendering engine is configured to render the at least the portion of the DICOM objects or the other DICOM objects to a second display of the second user device over the second WAN interface;
   an edge-side rendering architecture comprising:
      a local rendering engine that is coupled to the central archive via a third WAN interface and to a local archive; and
      a third user device comprising the local rendering engine or coupled to the local rendering engine via a local area network (LAN) interface, wherein the local rendering engine is configured to render at least a portion of the DICOM objects to a third display of the third user device;
   a memory; and
   one or more processors configured, when executing instructions stored in the memory, to:
      render the DICOM objects using the hub server-side rendering architecture, the hub and spoke server-side rendering architecture, and the edge-side rendering architecture based on network parameters including a latency, a geographical proximity to a data location, and a usage pattern, wherein each of the network parameters is associated with a threshold;
      establish a direction of data replication including associated data of DICOM objects, user preferences, or other configuration items, between the central hub and the at least one spoke; and
      transfer medical studies between the central hub and the at least one spoke using the first proxy adapter and the second proxy adapter.

2. The hybrid PACS of claim 1, wherein the one or more processors are further configured to render the DICOM objects using the edge-side rendering architecture in response to one or more of the network parameters being at or above the associated threshold.

3. The hybrid PACS of claim 1, wherein the one or more processors are further configured to render the DICOM objects using the hub server-side rendering architecture or the hub and spoke server-side rendering architecture in response to one or more of the network parameters being below the associated threshold.

4. The hybrid PACS of claim 1, wherein the one or more processors are further configured to:
enroll an additional spoke to a central hub; and
instruct the additional spoke to operate in a particular mode based on one or more of the network parameters.

5. A method performed by one or more processors of a hybrid picture archiving and communication system (PACS) comprising:
a hub server-side rendering architecture comprising:
a central hub that includes a central rendering engine, a central archive that stores digital imaging and communication in medicine (DICOM) objects from a first modality coupled to the central archive, and a first proxy adapter; and
a first user device coupled to the central hub via a first wide area network (WAN) interface, wherein the central rendering engine is configured to render the DICOM objects to a first display of the first user device via the first WAN interface;
a hub and spoke server-side rendering architecture comprising:
at least one spoke that includes a regional rendering engine, a regional archive that stores at least a portion of the DICOM objects of the central archive and other DICOM objects from a second modality coupled to the regional archive, and a second proxy adapter, wherein the regional rendering engine is coupled to the central archive via a clinical data interface; and
a second user device coupled to the at least one spoke via a second WAN interface, wherein the regional rendering engine is configured to render the at least the portion of the DICOM objects or the other DICOM objects to a second display of the second user device over the second WAN interface;
an edge-side rendering architecture comprising:
a local rendering engine that is coupled to the central archive via a third WAN interface and to a local archive; and
a third user device comprising the local rendering engine or coupled to the local rendering engine via a local area network (LAN) interface, wherein the local rendering engine is configured to render at least a portion of the DICOM objects to a third display of the third user device;
the method comprising:
rendering the DICOM objects using the hub server-side rendering architecture, the hub and spoke server-side rendering architecture, and the edge-side rendering architecture based on network parameters including a latency, a geographical proximity to a data location, and a usage pattern, wherein each of the network parameters is associated with a threshold;
establishing a direction of data replication including associated data of DICOM objects, user preferences, or other configuration items, between the central hub and the at least one spoke; and
transferring medical studies between the central hub and the spoke using the first proxy adapter and the second proxy adapter.

6. The method of claim 5, further comprising rendering the DICOM objects using the edge-side rendering architecture in response to one or more of the network parameters being at or above the associated threshold.

7. The method of claim 5, further comprising rendering the DICOM objects using the hub server-side rendering architecture or the hub and spoke server-side rendering architecture in response to one or more of the network parameters being below the associated threshold.

8. The method of claim 5, further comprising:
enrolling an additional spoke to the central hub; and
instructing the additional spoke to operate in a particular mode based on one or more of the network parameters.

* * * * *